(12) United States Patent
Samuel et al.

(10) Patent No.: US 11,741,231 B2
(45) Date of Patent: Aug. 29, 2023

(54) SYSTEMS AND METHODS FOR ACCESS CONTROL OF BIOS PROTOCOL NOTIFICATION

(71) Applicant: Dell Products L.P., Round Rock, TX (US)

(72) Inventors: Balasingh P. Samuel, Round Rock, TX (US); Baris Tas, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 252 days.

(21) Appl. No.: 16/857,567

(22) Filed: Apr. 24, 2020

(65) Prior Publication Data

US 2021/0334379 A1 Oct. 28, 2021

(51) Int. Cl.
*G06F 21/57* (2013.01)

(52) U.S. Cl.
CPC ...... *G06F 21/572* (2013.01); *G06F 2221/033* (2013.01)

(58) Field of Classification Search
CPC .............. G06F 21/572; G06F 2221/033
See application file for complete search history.

(56) References Cited

U.S. PATENT DOCUMENTS

| | | | |
|---|---|---|---|
| 2004/0215754 A1* | 10/2004 | Orleth | G06F 9/44536 709/223 |
| 2007/0234029 A1* | 10/2007 | Rothman | G06F 9/4401 713/2 |
| 2013/0104188 A1* | 4/2013 | Western | G06F 21/57 726/1 |
| 2016/0180094 A1* | 6/2016 | Dasar | G06F 9/4406 714/36 |
| 2019/0121982 A1* | 4/2019 | Wotherspoon | G06Q 20/18 |
| 2022/0004640 A1* | 1/2022 | Jacobs | G06F 21/575 |

* cited by examiner

*Primary Examiner* — Jaweed A Abbaszadeh
*Assistant Examiner* — Hyun Soo Kim
(74) *Attorney, Agent, or Firm* — Jackson Walker L.L.P

(57) ABSTRACT

A BIOS may include a plurality of protocol drivers and a protocol notification manager configured to receive a protocol notification registration from a consumer driver of the plurality of protocol drivers, receive a unique key associated with the consumer driver, receive a pre-authorized list from a producer driver of the plurality of protocol drivers, the pre-authorized list comprising one or more signed consumer identifiers, each of the one or more signed consumer identifiers identifying a respective one of the plurality of protocol drivers authorized to receive a protocol notification from the producer driver, determine if the unique key successfully decrypts a signed consumer identifier associated with the consumer driver, and perform access control of protocol notification from the producer driver to the consumer driver based on whether the unique key successfully decrypts the signed consumer identifier associated with the consumer driver.

21 Claims, 2 Drawing Sheets

SYSTEMS AND METHODS FOR ACCESS CONTROL OF BIOS PROTOCOL NOTIFICATION

TECHNICAL FIELD

The present disclosure relates in general to information handling systems, and more particularly to methods and systems for access control of protocol notification between drivers of a basic input/output system (BIOS) of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As is known in the art, an information handling system may include a basic input/output system (BIOS). Generally speaking, a BIOS may include any system, device, or apparatus configured to identify, test, and/or initialize information handling resources of an information handling system. In some instances, a BIOS may include a Unified Extensible Firmware Interface (UEFI). A BIOS may comprise boot firmware configured to be the first code executed by an information handling system when the information handling system is booted and/or powered on. As part of its initialization functionality, code for a BIOS may be configured to set components of an information handling system into a known state, so that one or more applications (e.g., an operating system or other application programs) stored on compatible media may be executed by and given control of the information handling system.

A portion of BIOS or UEFI functionality may be implemented using one or more protocol drivers that may define and execute a particular communication protocol. In existing implementations, a protocol driver may send notification of the protocol driver by the protocol driver to one or more other drivers. Further in such existing implementations, no access control mechanism exists to selectively allow or deny protocol notification.

The lack of an access control mechanism in existing approaches may enable a malicious actor to detect vulnerability points. By tracking and monitoring UEFI protocol installation points during a preboot process, a malicious actor may be able exploit weak points in an information handling system boot flow in order to breach an otherwise secure information handling system.

SUMMARY

In accordance with the teachings of the present disclosure, the disadvantages and problems associated with protocol notification between drivers of a BIOS may be reduced or eliminated.

In accordance with embodiments of the present disclosure, an information handling system may include a processor and a basic input/output system (BIOS) embodied in non-transitory computer-readable media and configured to be the first code executed by the processor when the information handling system is booted and configured to initialize components of the information handling system into a known state. The BIOS may include a plurality of protocol drivers and a protocol notification manager configured to receive a protocol notification registration from a consumer driver of the plurality of protocol drivers, receive a unique key associated with the consumer driver, receive a pre-authorized list from a producer driver of the plurality of protocol drivers, the pre-authorized list comprising one or more signed consumer identifiers, each of the one or more signed consumer identifiers identifying a respective one of the plurality of protocol drivers authorized to receive a protocol notification from the producer driver, determine if the unique key successfully decrypts a signed consumer identifier associated with the consumer driver, and perform access control of protocol notification from the producer driver to the consumer driver based on whether the unique key successfully decrypts the signed consumer identifier associated with the consumer driver.

In accordance with these and other embodiments of the present disclosure, a method may include in an information handling system comprising a basic input/output system (BIOS) embodied in non-transitory computer-readable media and configured to be the first code executed by a processor when the information handling system is booted and configured to initialize components of the information handling system into a known state: receiving a protocol notification registration from a consumer driver of a plurality of protocol drivers embodied within the BIOS; receiving a unique key associated with the consumer driver; receiving a pre-authorized list from a producer driver of the plurality of protocol drivers, the pre-authorized list comprising one or more signed consumer identifiers, each of the one or more signed consumer identifiers identifying a respective one of the plurality of protocol drivers authorized to receive a protocol notification from the producer driver; determining if the unique key successfully decrypts a signed consumer identifier associated with the consumer driver; and performing access control of protocol notification from the producer driver to the consumer driver based on whether the unique key successfully decrypts the signed consumer identifier associated with the consumer driver.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to, in an information handling system comprising a basic input/output system (BIOS) embodied in non-transitory computer-readable media and configured to be the first code executed by the processor when the information handling system is booted and configured to initialize components of the information handling system into a known state: receive a protocol notification registration from a consumer driver of a plurality of protocol drivers embodied within the BIOS; receive a unique key associated with the consumer driver; receive a pre-authorized list from a producer driver of the plurality of protocol drivers, the pre-authorized list comprising one or more signed consumer identifiers, each of the one or more signed consumer identifiers identifying a respective one of the plurality of protocol drivers authorized to receive a protocol notification from the producer driver; determine if the unique key successfully decrypts a signed consumer identifier associated with the consumer driver; and perform access control of protocol notification from the producer driver to the consumer driver based on whether the unique key successfully decrypts the signed consumer identifier associated with the consumer driver.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
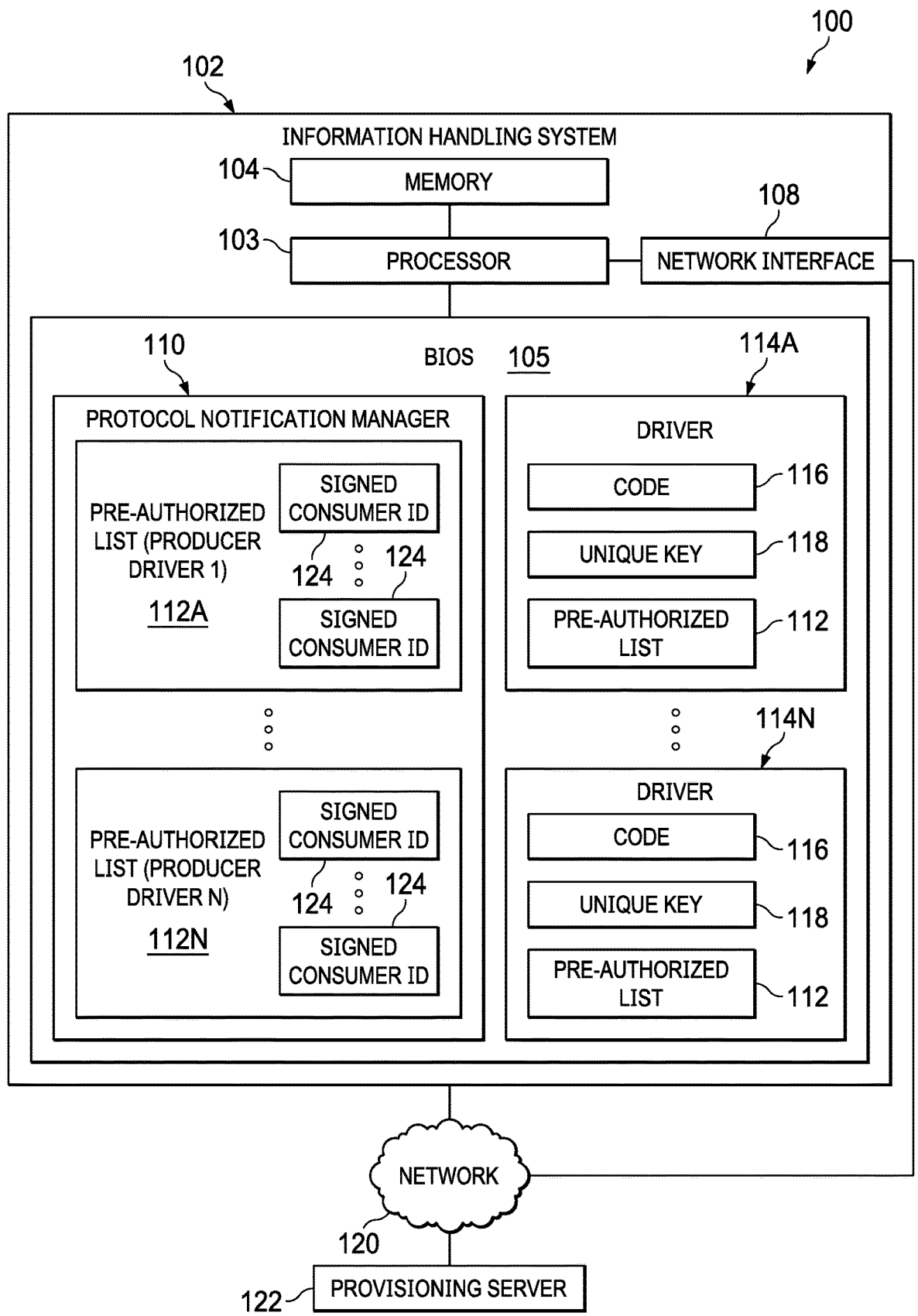
FIG. 1 illustrates a block diagram of an example system for access control of protocol notification in a BIOS of an information handling system, in accordance with embodiments of the present disclosure.
Figure 2:
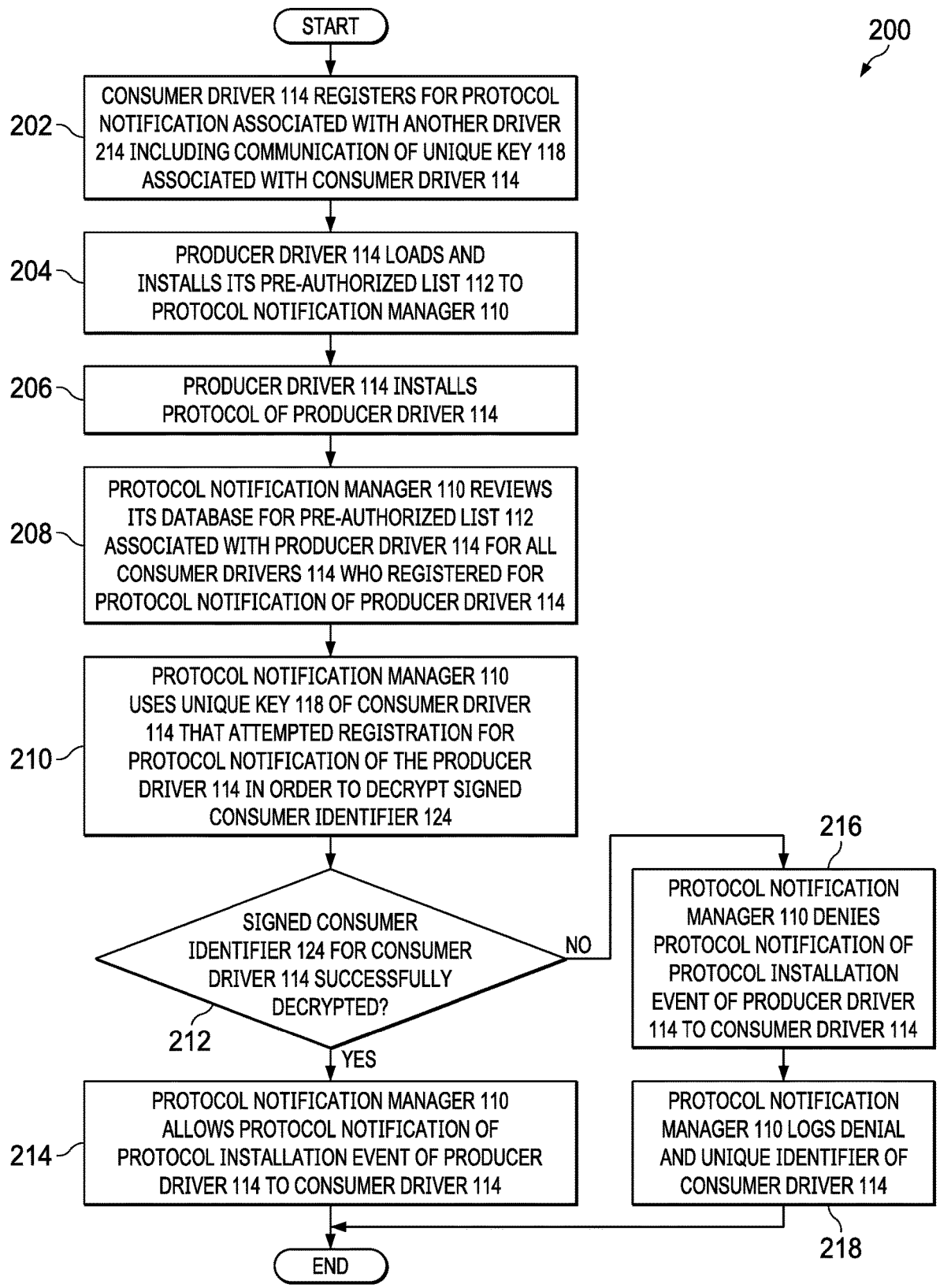
FIG. 2 illustrates a flow chart of an example method for access control of protocol notification in a BIOS of an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for access control of protocol notification in a BIOS 105 of an information handling system 102, in accordance with embodiments of the present disclosure. As shown in FIG. 1, system 100 may include information handling system 102, a network 120, and a provisioning server 122.

In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, and a network interface 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102.

"BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102. As shown in FIG. 1, BIOS 105 may include a protocol notification manager 110 and a plurality of protocol drivers 114. Functionality of BIOS 105, protocol notification manager 110, and protocol drivers 114 may be described in greater detail below.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC."

In addition to processor 103, memory 104, BIOS 105, and network interface 108, information handling system 102 may include one or more other information handling resources.

Network 120 may comprise a network and/or fabric configured to couple information handling system 102 and provisioning server 122 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Provisioning server 122 may comprise an information handling system, and may include any system, device, or apparatus configured to facilitate and manage end use provisioning of an operating system for network interface 108. For example, in some embodiments, provisioning server 122 may comprise a hardware security module (HSM) server that may serve as a key management platform for one or more components of information handling system 102.

Protocol notification manager 110 may include a program of instructions configured to manage protocol notifications in order to limit protocol installation events of a "producer" driver 114 only to selected pre-authorized UEFI "consumer" drivers 114. The producer driver 114 of a UEFI protocol may install within the protocol notification manager a pre-authorized list 112 which comprises a secure database listing signed consumer identifiers 124 (e.g., global unique identifiers) of consumer drivers 114 authorized to receive notification of a protocol installation by a producer driver. As shown in FIG. 1, each producer driver 114 may install its own pre-authorized list 112. Each pre-authorized list 112 may be created and encrypted at build time of BIOS 105 from the provisioning server 122. Thus, pre-authorized lists 112 may have a root of trust with provisioning server 122.

Each pre-authorized list 112 (including its respective signed consumer identifiers 124) may also be added to the firmware file system of its respective producer driver 114. Thus, each producer driver 114 may include its respective pre-authorized list 112 in addition to its firmware code 116.

During the build process, provisioning server 122 may also generate a unique key 118 for each consumer driver 114 identified in the pre-authorized list 112 of a producer driver 114. During such build process, the unique key 118 may be added to the consumer driver 114. Thus, each consumer driver 114 may include a unique key 118 for each producer driver 114 for which it is authorized to receive protocol notification in addition to its firmware code 116. Accordingly, pre-authorized consumer drivers 114 are bound to respective producer drivers 114 at system build time.

It is noted that a driver 114 may be both a producer driver 114 for one protocol and a consumer driver 114 for receiving protocol notifications of another protocol.

In operation post-build, protocol notification manager 110 may manage communication of protocol notifications such that a consumer driver 114 may only receive protocol notification of a protocol installation by a producer driver 114 if a unique key 118 of the consumer driver 114 successfully unlocks the signed consumer identifier 124 of the producer driver 114 which is associated with the consumer driver 114.

Accordingly, using pre-authorized lists 112 as described above, protocol notification manager 110 may implement access control for UEFI protocol notification events.

In some embodiments, BIOS 105 may include two-fold secure protection. In such embodiments, in addition to encryption of contents of pre-authorized lists 112, provisioning server 122 may also sign the entirety of BIOS 105 with a key. Accordingly, BIOS 105 may automatically trigger a recovery process if pre-authorized lists 112 are altered outside of the BIOS build process.

To further illustrate, a pre-authorized list 112 for a producer driver 114 may be encrypted with a unique key 118 by provisioning server 122 during build time. For a consumer driver 114 to receive a protocol notification for producer driver 114 from protocol notification manager 110, the consumer driver 113 must know the unique key 118. Thus, if a consumer driver 114 were to register for "notification of producer driver 114" for a notification is triggered when producer driver 114 installs its protocol. Consumer driver 114 may sends unique key 118 to protocol notification manager 110. Then, when producer driver 114 installs the protocol, protocol notification manager 110 may use consumer driver 114's unique key 118 to decrypt pre-authorized list 112 for producer driver 114. Protocol notification manager 110 may determine if consumer driver 114's consumer identifier 124 is in the pre-authorized list 112. If consumer driver 114's consumer identifier 124 is in the pre-authorized list 112, protocol notification manager 110 may send the protocol notification to consumer driver 114. If not, protocol notification manager 110 may deny the protocol notification.

FIG. 2 illustrates a flow chart of an example method 200 for access control of protocol notification in a BIOS of an information handling system, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a consumer driver 114 may register for protocol notification associated with another driver 114 (e.g., a producer driver 114). Such registration may be made using standard UEFI protocol. In some embodiments, the consumer driver 114 may pass its unique key 118 as a parameter in the registration request. In other embodiments, the consumer driver 114 may communicate unique key 118 using a different function.

At step 204, a producer driver 114 may load and may install its respective pre-authorized list 112 to protocol notification manager 110. At step 206, the producer driver 114 may install the protocol of the producer driver 114 using a standard installation protocol.

At step 208, protocol notification manager 110 may review its database for the pre-authorized list 112 associated with the producer driver 114 for all consumer drivers 114 who registered for protocol notification of the producer driver 114.

At step 210, protocol notification manager 110 may use each unique key 118 of each consumer driver 114 that attempted registration for protocol notification of the producer driver 114 in order to decrypt signed consumer identifiers 124. In some embodiments, protocol notification manager 110 may use unique keys 118 in combination with a platform public key or other key to decrypt signed consumer identifiers 124.

At step 212, for each consumer driver 114 that attempted registration for protocol notification of the producer driver 114, protocol notification manager 110 may determine if the signed consumer identifier 124 for such consumer driver 114 was successfully decrypted. If the signed consumer identifier 124 for such consumer driver 114 was successfully decrypted, method 200 may proceed to step 214. Otherwise, method 200 may proceed to step 216.

At step 214, responsive to the signed consumer identifier 124 for such consumer driver 114 being successfully decrypted, protocol notification manager 110 may allow protocol notification of the protocol installation event of the producer driver 114 to such consumer driver 114. After completion of step 214, method 200 may end.

At step 216, responsive to unsuccessful decryption of the signed consumer identifier 124 for such consumer driver 114, protocol notification manager 110 may deny protocol notification of the protocol installation event of the producer driver 114 to such consumer driver 114. Furthermore, at step 218, such denial may be logged along with the unique identifier of such consumer driver 114 in a manner accessible to a security analyst or other individual to review and investigate potential security exposures and offending drivers 114. After completion of step 218, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a processor; and
a basic input/output system (BIOS) embodied in non-transitory computer-readable media and configured to be the first code executed by the processor when the information handling system is booted and configured to initialize components of the information handling system into a known state, the BIOS comprising:
a plurality of protocol drivers; and
a protocol notification manager configured to:
receive a protocol notification registration from a first consumer driver of the plurality of protocol drivers;
receive from the first consumer driver, a unique key for decrypting a first signed consumer identifier, comprising a signed identifier of the first consumer driver, received from a producer driver of the plurality of protocol drivers;
receive a pre-authorized list from the producer driver, the pre-authorized list comprising one or more signed consumer identifiers, each of the one or more signed consumer identifiers identifying a respective one of the plurality of protocol drivers authorized to receive a protocol notification from the producer driver;
determine if the unique key successfully decrypts the first signed consumer identifier; and
perform access control of protocol notification from the producer driver to the first consumer driver based on whether the unique key successfully decrypts the first signed consumer identifier.

2. The information handling system of claim 1, wherein performing access control comprises allowing protocol notification from the producer driver to the first consumer driver if the unique key successfully decrypts the first signed consumer identifier.

3. The information handling system of claim 1, wherein performing access control comprises denying protocol notification from the producer driver to the first consumer driver if the unique key is unsuccessful in decrypting the first signed consumer identifier.

4. The information handling system of claim 3, wherein performing access control further comprises logging information regarding denial of protocol notification.

5. The information handling system of claim 1, wherein each of the plurality of protocol drivers includes protocol driver code and at least one of:
a unique key for each producer driver from which the protocol driver is authorized to receive protocol notifications; and
a list of signed consumer identifiers for each consumer driver authorized to receive protocol installation notifications from the protocol driver.

6. The information handling system of claim 1, wherein the BIOS comprises a Unified Extensible Firmware Interface.

7. The information handling system of claim 1, wherein performing access control comprises determining whether the unique key in combination with a system public key successfully decrypts the first signed consumer identifier.

8. A method comprising, in an information handling system comprising a basic input/output system (BIOS) embodied in non-transitory computer-readable media and configured to be the first code executed by a processor when the information handling system is booted and configured to initialize components of the information handling system into a known state:
receiving a protocol notification registration from a first consumer driver of a plurality of protocol drivers embodied within the BIOS;
receiving, from the consumer driver, a unique key for decrypting a first signed consumer identifier, comprising a signed identifier of the first consumer driver, received from a producer driver of the plurality of protocol drivers;
receiving a pre-authorized list from the producer driver, the pre-authorized list comprising one or more signed consumer identifiers, each of the one or more signed consumer identifiers identifying a respective one of the plurality of protocol drivers authorized to receive a protocol notification from the producer driver;
determining if the unique key successfully decrypts the first signed consumer identifier; and
performing access control of protocol notification from the producer driver to the first consumer driver based on whether the unique key successfully decrypts the first signed consumer identifier.

9. The method of claim 8, wherein performing access control comprises allowing protocol notification from the producer driver to the first consumer driver if the unique key successfully decrypts the first signed consumer identifier.

10. The method of claim 8, wherein performing access control comprises denying protocol notification from the producer driver to the first consumer driver if the unique key is unsuccessful in decrypting the first signed consumer identifier.

11. The method of claim 10, wherein performing access control further comprises logging information regarding denial of protocol notification.

12. The method of claim 8, wherein each of the plurality of protocol drivers includes protocol driver code and at least one of:
a unique key for each producer driver from which the protocol driver is authorized to receive protocol notifications; and
a list of signed consumer identifiers for each consumer driver authorized to receive protocol installation notifications from the protocol driver.

13. The method of claim 8, wherein the BIOS comprises a Unified Extensible Firmware Interface.

14. The method of claim 8, wherein performing access control comprises determining whether the unique key in combination with a system public key successfully decrypts the first signed consumer identifier.

15. An article of manufacture comprising:
a non-transitory computer readable medium; and
computer-executable instructions carried on the computer readable medium, the instructions readable by a processor, the instructions, when read and executed, for causing the processor to, in an information handling system comprising a basic input/output system (BIOS) embodied in non-transitory computer-readable media and configured to be the first code executed by the processor when the information handling system is booted and configured to initialize components of the information handling system into a known state:
- receive a protocol notification registration from a first consumer driver of a plurality of protocol drivers embodied within the BIOS;
- receive, from the first consumer driver, a unique key for decrypting a signed consumer identifier, comprising a signed identifier of the first consumer driver, received from a producer driver of the plurality of protocol drivers;
- receive a pre-authorized list from the producer driver, the pre-authorized list comprising one or more signed consumer identifiers, each of the one or more signed consumer identifiers identifying a respective one of the plurality of protocol drivers authorized to receive a protocol notification from the producer driver;
- determine if the unique key successfully decrypts the first signed consumer identifier; and
- perform access control of protocol notification from the producer driver to the first consumer driver based on whether the unique key successfully decrypts the first signed consumer identifier.

16. The article of claim 15, wherein performing access control comprises allowing protocol notification from the producer driver to the first consumer driver if the unique key successfully decrypts the first signed consumer identifier.

17. The article of claim 15, wherein performing access control comprises denying protocol notification from the producer driver to the first consumer driver if the unique key is unsuccessful in decrypting the first signed consumer identifier.

18. The article of claim 17, wherein performing access control further comprises logging information regarding denial of protocol notification.

19. The article of claim 15, wherein each of the plurality of protocol drivers includes protocol driver code and at least one of:
- a unique key for each producer driver from which the protocol driver is authorized to receive protocol notification; and
- a list of signed consumer identifiers for each consumer driver authorized to receive protocol installation notifications from the protocol driver.

20. The information handling system of claim 15, wherein the BIOS comprises a Unified Extensible Firmware Interface.

21. The article of claim 15, wherein performing access control comprises determining whether the unique key in combination with a system public key successfully decrypts the first signed consumer identifier.

* * * * *